US009223241B2

(12) United States Patent
Nakashio

(10) Patent No.: US 9,223,241 B2
(45) Date of Patent: Dec. 29, 2015

(54) IMAGE PROCESSING APPARATUS AND IMAGE PROCESSING METHOD

(71) Applicant: CANON KABUSHIKI KAISHA, Tokyo (JP)

(72) Inventor: Hidekazu Nakashio, Warabi (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 13/924,802

(22) Filed: Jun. 24, 2013

(65) Prior Publication Data

US 2013/0342853 A1 Dec. 26, 2013

(30) Foreign Application Priority Data

Jun. 26, 2012 (JP) ................................ 2012-143139

(51) Int. Cl.

| | |
|---|---|
| ***G06F 15/00*** | (2006.01) |
| ***G03G 15/01*** | (2006.01) |
| ***G03G 13/01*** | (2006.01) |
| ***G03G 15/00*** | (2006.01) |

(52) U.S. Cl.

CPC ............ *G03G 15/0105* (2013.01); *G03G 13/01* (2013.01); *G03G 15/5041* (2013.01); *G03G 2215/00569* (2013.01); *G03G 2215/0164* (2013.01)

(58) Field of Classification Search

CPC G03G 15/0105; G03G 15/5041; G03G 13/01
USPC .................................................. 358/1.1–1.16
See application file for complete search history.

(56) References Cited

U.S. PATENT DOCUMENTS

| | | | | |
|---|---|---|---|---|
| 5,950,036 | A * | 9/1999 | Konishi | 399/8 |
| 7,369,271 | B2 | 5/2008 | Itagaki | |
| 7,382,490 | B2 | 6/2008 | Lammens et al. | |
| 8,755,837 | B2 | 6/2014 | Rhoads et al. | |
| 2002/0180998 | A1 * | 12/2002 | Wu | 358/1.9 |
| 2005/0128498 | A1 | 6/2005 | Matsuzaki | |
| 2005/0259280 | A1 * | 11/2005 | Rozzi | 358/1.9 |
| 2007/0070371 | A1 | 3/2007 | Miyazaki | |
| 2008/0024844 | A1 | 1/2008 | Yabe | |

(Continued)

FOREIGN PATENT DOCUMENTS

| | | | |
|---|---|---|---|
| CN | 102243455 | A | 11/2011 |
| CN | 102547027 | A | 7/2012 |

(Continued)

*Primary Examiner* — Benny Q Tieu
*Assistant Examiner* — Michael Y Tzeng
(74) *Attorney, Agent, or Firm* — Canon USA, Inc., IP Division

(57) ABSTRACT

An image processing apparatus that includes a controlling unit for controlling executions of a single color calibration which is for correcting a reproduction characteristic of a single color image, formed by an image forming unit, according to measurement of a single color image formed by the image forming unit with a single color recording material and a multi-color calibration which is for correcting a reproduction characteristic of a multi-color image, formed by the image forming unit, according to measurement of a multi-color image formed by the image forming unit with a plurality of recording materials. It is decided to execute at least one of the single color calibration and the multi-color calibration in accordance with history information of the single color calibration executed by the controlling and then the calibration which has been decided on is executed by the controlling unit.

22 Claims, 14 Drawing Sheets

(56) References Cited

U.S. PATENT DOCUMENTS

| | | | | |
|---|---|---|---|---|
| 2009/0251715 | A1* | 10/2009 | Kita | 358/1.9 |
| 2011/0063633 | A1* | 3/2011 | Ernst et al. | 358/1.9 |
| 2011/0199634 | A1* | 8/2011 | Bastani et al. | 358/1.15 |
| 2011/0292417 | A1 | 12/2011 | Miyagi | |
| 2011/0299102 | A1 | 12/2011 | Matsuzaki | |
| 2012/0133960 | A1* | 5/2012 | Henderson | 358/1.9 |
| 2013/0038886 | A1 | 2/2013 | Kondo | |
| 2013/0235430 | A1 | 9/2013 | Sakatani | |

FOREIGN PATENT DOCUMENTS

| | | | |
|---|---|---|---|
| EP | 2387225 | A1 | 11/2011 |
| JP | 2004-069803 | A | 3/2004 |
| JP | 2010-263345 | A | 11/2010 |
| JP | 2011-27830 | A | 2/2011 |
| JP | 4677379 | B2 | 4/2011 |
| JP | 2011-254350 | A | 12/2011 |
| RU | 2327216 | C2 | 6/2008 |
| RU | 93977 | U1 | 5/2010 |

* cited by examiner

FIG. 6

601

| SHEET INFORMATION (602) | REGISTRATION DATE AND TIME (603) | ENVIRONMENT INFORMATION (604) | NUMBER OF OUTPUT SHEETS (COUNT) (605) |
|---|---|---|---|
| STANDARD SHEET | 2012/02/21 12:34 | STANDARD AIR TEMPERATURE/ STANDARD HUMIDITY | 800 |
| PLAIN PAPER 1 (64 TO 81 g/m$^2$) | 2010/01/01 11:00 | HIGH TEMPERATURE/ LOW HUMIDITY | 5000 |
| PLAIN PAPER 2 (82 TO 105 g/m$^2$) | 2009/05/01 01:00 | HIGH TEMPERATURE/ STANDARD HUMIDITY | 7000 |
| ... | ... | ... | ... |
| THICK PAPER 1 (106 TO 163 g/m$^2$) | UNREGISTERED | UNREGISTERED | UNREGISTERED |

FIG. 10

1001

| TONE DATA (1002) | MEASUREMENT VALUE (DENSITY) (1003) |
| --- | --- |
| C PATCH 1 | 0.213 |
| C PATCH 2 | 0.404 |
| C PATCH 3 | 0.624 |
| ... | ... |
| K PATCH 5 | 1.010 |
| K PATCH 6 | 1.244 |
| K PATCH 7 | 1.413 |

FIG. 13

1301

| MULTI-COLOR CHART DATA (1302) | MEASUREMENT VALUE (L*) (1303) | MEASUREMENT VALUE (a*) (1304) | MEASUREMENT VALUE (b*) (1305) |
|---|---|---|---|
| COLOR PATCH 1 | 84 | -14 | -4 |
| COLOR PATCH 2 | 80 | -9 | -3 |
| COLOR PATCH 3 | 74 | 10 | 2 |
| ... | ... | ... | ... |
| COLOR PATCH 26 | 61 | 21 | 50 |
| COLOR PATCH 27 | 43 | 72 | -22 |
| COLOR PATCH 28 | 18 | 0 | 0 |

IMAGE PROCESSING APPARATUS AND IMAGE PROCESSING METHOD

BACKGROUND OF THE INVENTION

1. Field of the Invention

The present disclosure relates to an image processing apparatus and an image processing method for correcting a color of an image output from a printer.

2. Description of the Related Art

In response to the need for outputting documents and images in color, which has been increasing in recent years in keeping with the trend of computerization, various types of printers have emerged. Types of color image formation include dye sublimation, thermal transfer, and inkjet, but electrophotography is considered to excel in speed of the image formation.

Image forming apparatuses employing electrophotographic methods, however, suffer from significant variation in image density depending on operating temperature and humidity, characteristic variability of a photosensitive body and a developing agent, and the durability of a developing device and the like. Color image forming apparatuses, in particular, present additional disadvantage of change in color.

To solve these problems, traditional electrophotographic apparatuses employ calibration techniques to create a one-dimensional LUT (look up table) for density correction corresponding to a “single color” of cyan, magenta, yellow, and black (hereinafter referred to as C, M, Y, and K, respectively). An LUT is a table that represents output data corresponding to input data partitioned by a specific interval and allows description of a non-linear characteristic, which cannot be described by an arithmetic operational expression. The one-dimensional LUT for density correction is a table that includes an output signal value corresponding to each input signal value of C, M, Y, and K. A toner is used by an amount corresponding to the output signal value to form an image on paper.

In order to create a one-dimensional LUT, a chart including data of different densities corresponding to each toner of C, M, Y, and K is output by a printer.

This chart is then measured by a scanner, a colorimeter, or the like. Measured values are compared against predetermined target data to create a one-dimensional LUT for density correction for each of C, M, Y, and K independently. This processing is called single color calibration. A single color calibration is executed to correct a single color reproduction characteristic, such as a maximum density and a tone characteristic.

It is, however, difficult to guarantee a “multi-color” by adjusting the single color density characteristics with the one-dimensional LUT, because a multi-color, including a plurality of toners such as red, green, blue, C, M, and Y, involves a non-linear difference depending on a printer. As a solution to this, a calibration technique has been proposed in which a chart, created with a multi-color within a range that can be output by a printer, is output by the printer and then measured by a scanner or a colorimeter for a comparison against a predetermined target value to arrive at a correction value (see Japanese Patent Application Laid-Open No. 2011-254350). In this document, a technique has been disclosed in which a destination profile, among ICC profiles, is modified to correct a color difference of a multi-color. An ICC profile is data, defined by ICC (International Color Consortium), to be used for a color conversion. In this technique, a chart, created with a multi-color, is output by a printer and then is measured by a scanner or a colorimeter. A result of the measurement and a predetermined target value are used to arrive at a difference. The difference is used to update a three-dimensional LUT (destination profile) to correct the multi-color. The three-dimensional LUT is for converting a device independent color space (L*a*b*) of the ICC profiles into a device dependent color space (CMYK). This processing is called multi-color calibration. A multi-color calibration is executed to correct a color reproduction characteristic for a multi-color that is described by combining (overlaying) a plurality of color toners. L*a*b* is a device independent color space, with L* denoting brightness and a*b* denoting hue and saturation. It is desirable that the single color calibration be executed to correct a single color density before the multi-color calibration is executed. In some cases depending on a state of a printer, however, a multi-color may be more apt to vary than a single color, and, hence, executing the multi-color calibration alone may provide a sufficient result of correction. For example, a user with ample opportunity to output data of a “multi-color,” such as a photograph, is likely to obtain a sufficient result of correction by merely executing the multi-color calibration.

It is difficult for a general user, however, to make an appropriate judgment on whether both calibrations should be executed or the multi-color calibration should be executed alone when giving an instruction to execute calibrations. As a result, the user would execute both calibrations too often, which causes a series of actions including outputting and scanning a chart to be executed more than once. This results in excessive time and effort taken for the calibration.

As a solution to the challenge that the calibrations are executed too often as described above, a technique has been proposed in which a timing for executing a calibration is appropriately set (see Japanese Patent Application Laid-Open No. 2004-69803). This technique decides the timing of a subsequent execution of the calibration on the basis of the number of sheets printed after a previous execution of the single color calibration and before a present execution of the single color calibration, and on the basis of a density difference detected during the executions of the calibration. This can suppress density variations and simultaneously optimize the number of executions of the density control.

The related art, however, discloses the technique that is merely concerning the execution of one type of calibration, which is the single color calibration. A user, thus, cannot make an appropriate judgment on which calibration should be executed when more than one type of calibration technique, which are the single color calibration and the multi-color calibration, can be executed independently from each other.

SUMMARY OF THE INVENTION

To solve the challenges described above, an image processing apparatus according to an embodiment of the present invention includes: an image forming unit for forming an image;

a measuring unit for measuring the image formed by the image forming unit; and a controlling unit for controlling an execution of a single color calibration and an execution of a multi-color calibration, the single color calibration being configured to correct a reproduction characteristic of an image formed by the image forming unit with a single color, the correction being performed according to a result of measurement performed by the measuring unit on a single color image formed by the image forming unit with a recording material of a single color, the multi-color calibration being configured to correct a reproduction characteristic of an image formed by the image forming unit with a multi-color, the correction being performed according to a result of measurement performed by the measuring unit on a multi-color image formed by the image forming unit with recording materials of a plurality of colors; wherein the apparatus further includes a deciding unit for deciding that at least one of the single color calibration and the multi-color calibration be executed in accordance with history information of the single color calibration executed by the controlling unit, and the controlling unit executes the at least one of the calibrations decided on by the deciding unit.

Timings for executing the single color calibration and the multi-color calibration are each determined to prevent the calibrations from being executed too often. This allows reduction in time and effort taken to execute the calibrations, thereby improving usability.

Further features of the present invention will become apparent from the following description of exemplary embodiments (with reference to the attached drawings).

BRIEF DESCRIPTION OF THE DRAWINGS

FIG. 6 is a diagram of items of history information 601 according to a first embodiment;

FIG. 10 is a diagram of a density history added to the history information 601 according to the second embodiment;

FIG. 13 is a diagram of a color history added to the history information 601 according to the third embodiment.

DESCRIPTION OF THE EMBODIMENTS

With reference to the drawings, some embodiments of the present invention will now be described.

Figure 1:
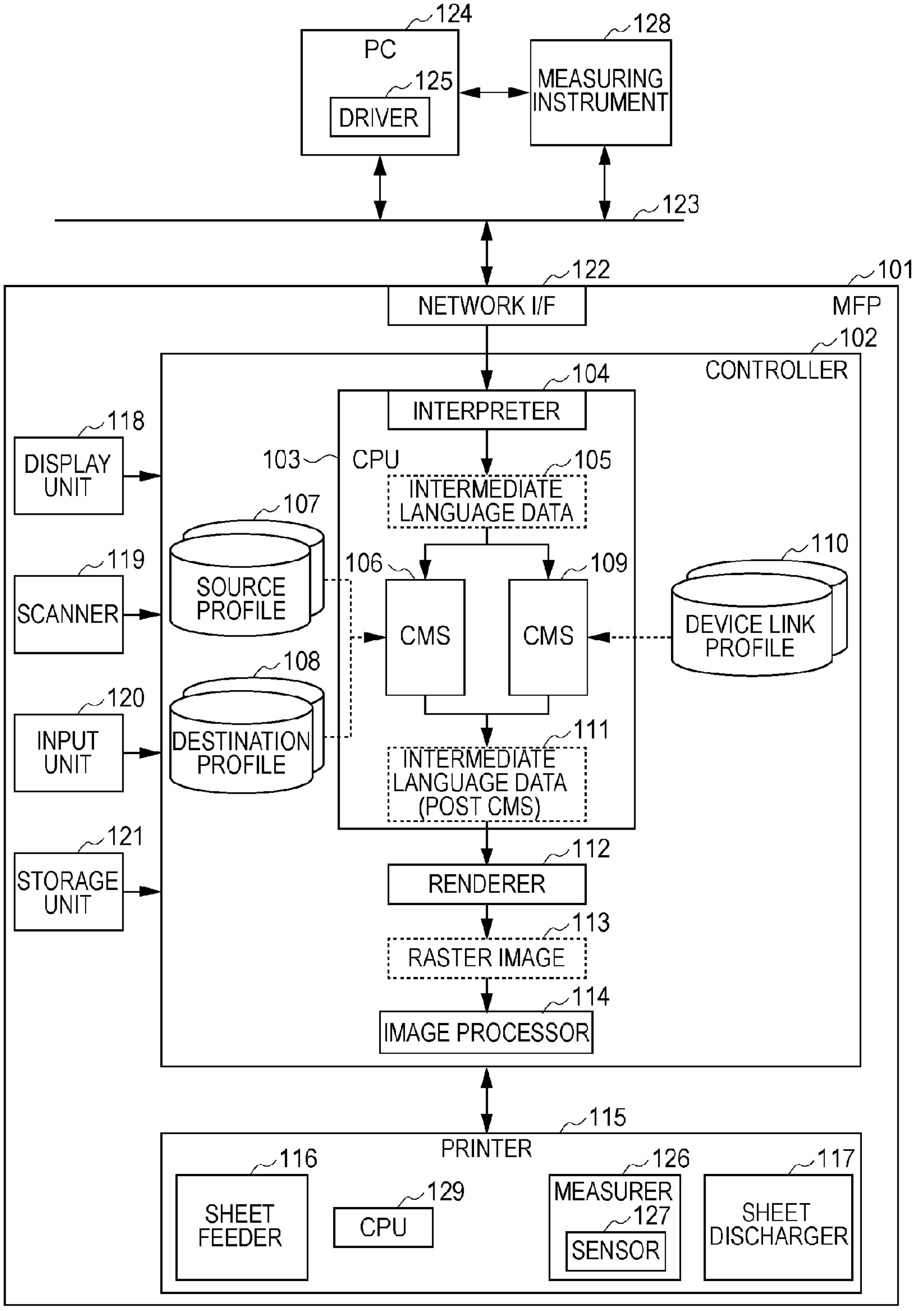
FIG. 1 is a block diagram of a system.

FIG. 1 is a block diagram of a system in the present embodiments. An MFP (multi function printer) 101 of an image processing apparatus uses toners of cyan, magenta, yellow, and black (hereinafter referred to as C, M, Y, and K, respectively) and is connected through a network 123 to other network-compatible devices. A PC 124 is connected through the network 123 to the MFP 101. A printer driver 125 in the PC 124 sends printing data to the MFP 101.

The MFP 101 will now be described in detail. A network I/F 122 receives the print data and the like. A controller 102 includes a CPU 103, a renderer 112, and an image processor 114. An interpreter 104 of the CPU 103 interprets a PDL (page description language) section of the print data that has been received and generates intermediate language data 105.

A CMS 106 performs a color conversion using a source profile 107 and a destination profile 108 to generate intermediate language data (post CMS) 111. CMS is the acronym of color management system, and a CMS performs a color conversion using the information of profiles to be described hereinafter. The source profile 107 is a profile for converting a device dependent color space, such as RGB and CMYK, into a device independent color space, such as XYZ and L*a*b* (hereinafter referred to as Lab) defined by CIE (International Commission on Illumination). XYZ, like Lab, is a device independent color space and describes colors with tristimulus values. The destination profile 108 is a profile for converting a device independent color space into a CMYK color space that is dependent on a device (a printer 115).

A CMS 109 performs a color conversion using a device link profile 110 to generate the intermediate language data (post CMS) 111. Here, the device link profile 110 is a profile for directly converting a device dependent color space, such as RGB and CMYK, into the CMYK color space that is dependent on a device (the printer 115). The selection as to which CMS to use, the CMS 106 or the CMS 109, is dependent on a setting in the printer driver 125.

In the present embodiments, the different CMSs (106 and 109) are used according to the type of profiles (107, 108, and 110). Alternatively, one CMS may handle a plurality of types of profiles. In addition, the types of profiles described in the present embodiments are not limiting. Any type of profile may be used as long as a device dependent CMYK color space dependent on the printer 115 is used.

The renderer 112 generates a raster image 113 from the intermediate language data (post CMS) 111 that has been generated. The image processor 114 performs image processing on the raster image 113 and an image read by a scanner 119. The image processor 114 will be described hereinafter in detail.

The printer 115 is connected to the controller 102 and forms an image using output data on a sheet with a color toner, such as C, M, Y, and K. The printer 115 includes a sheet feeder 116 for feeding a sheet, a sheet discharger 117 for discharging the sheet with an image formed thereon, and a measurer 126.

The measurer 126 includes a sensor 127 capable of obtaining a spectral reflectance and a value of a device independent color space, such as Lab and XYZ, and is controlled by a CPU 129 that controls the printer 115. The measurer 126 uses the sensor 127 to read a patch printed by the printer 115 on a print medium, such as a sheet of paper, and sends to the controller 102 numerical information that has been read. The controller 102 uses the numerical information to perform calculation and uses a result of the calculation to execute a single color calibration and a multi-color calibration.

A display unit 118 is a UI (user interface) for displaying an instruction to a user and a state of the MFP 101. The display unit 118 is used when the single color calibration and the multi-color calibration, to be described hereinafter, are executed.

The scanner 119 includes an automatic document feeder. The scanner 119 uses a light source, which is not shown, to irradiate a batch of original images or one original image and uses a lens to form an original reflected image on a solid-state image sensor, such as a CCD (charge coupled device) sensor. The scanner 119 then obtains a raster image read signal as image data from the solid-state image sensor.

An input unit 120 is an interface for receiving an input from the user. Part of the input unit may be a touch panel integrated with the display unit 118.

A storage unit 121 stores data processed by the controller 102, data received by the controller 102, and the like.

A measuring instrument 128 is an external measuring device provided on the network or connected to the PC 124 and, like the measurer 126, capable of obtaining a spectral reflectance and a value of a device independent color space, such as Lab and XYZ.

Figure 2:
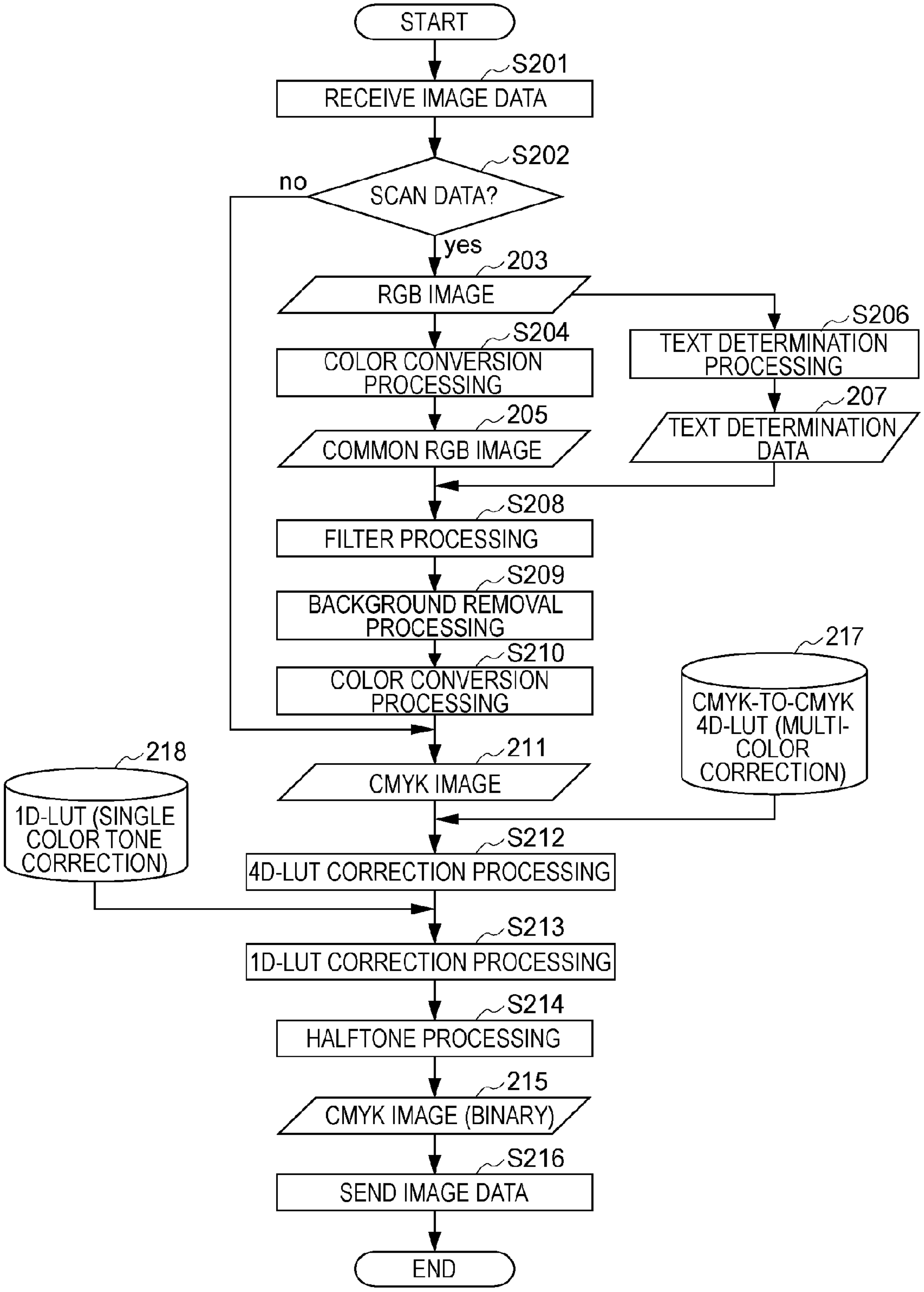
FIG. 2 is a flowchart of image processing.

With reference to FIG. 2, the process flow of the image processor 114 will now be described. FIG. 2 is a flowchart of image processing performed on the raster image 113 and an image read by the scanner 119. The process flow of FIG. 2 is achieved by the execution of an ASIC (application specific integrated circuit) which is not shown but residing in the image processor 114.

In step S201, image data is received. In step S202, it is determined whether the data that has been received is scan data received from the scanner 119 or the raster image 113 sent from the printer driver 125.

If the data is not scan data, the data is the raster image 113 that has been rendered by the renderer 112 as bitmaps and has been converted by a CMS into a CMYK image 211 that is a device dependent CMYK.

If the data is scan data, the data is an RGB image 203. In step S204, the data is subjected to color conversion processing to generate a common RGB image 205. Here, the common RGB image 205 is defined by a device independent RGB color space and can be converted by calculation into a device independent color space, such as Lab.

Meanwhile, in step S206, text determination processing is performed to generate text determination data 207. Here, an edge and the like of the image are detected to generate the text determination data 207.

Then, in step S208, filter processing is performed, using the text determination data 207, on the common RGB image 205. Different types of filter processing are performed, using the text determination data 207, on a text portion and other portion.

Then, background removal processing is performed in step S209 and color conversion processing is performed in step S210 to generate the CMYK image 211 with a background removed.

Then, in step S212, multi-color correction processing using a 4D-LUT 217 is performed. A 4D-LUT is a four-dimensional LUT (look up table) for converting a combination of signal values for outputting toners of C, M, Y, and K into another combination of signal values of C, M, Y, and K. The 4D-LUT 217 is generated by the "multi-color calibration" to be described hereinafter. The use of the 4D-LUT allows correction of a "multi-color" that is a color including a plurality of toners.

Subsequent to the correction of the multi-color in step S212, the image processor 114 corrects the tone characteristic of each single color of C, M, Y, and K with a 1D-LUT 218 in step S213. The 1D-LUT is a one-dimensional LUT (look up table) for correcting each color (single color) of C, M, Y, and K. The 1D-LUT is generated by the "single color calibration" to be described hereinafter.

The image processor 114 finally performs halftone processing, such as screen processing and error diffusion processing, to generate a CMYK image (binary) 215 in step S214, and send the image data to the printer 115 in step S216.

Figure 3:
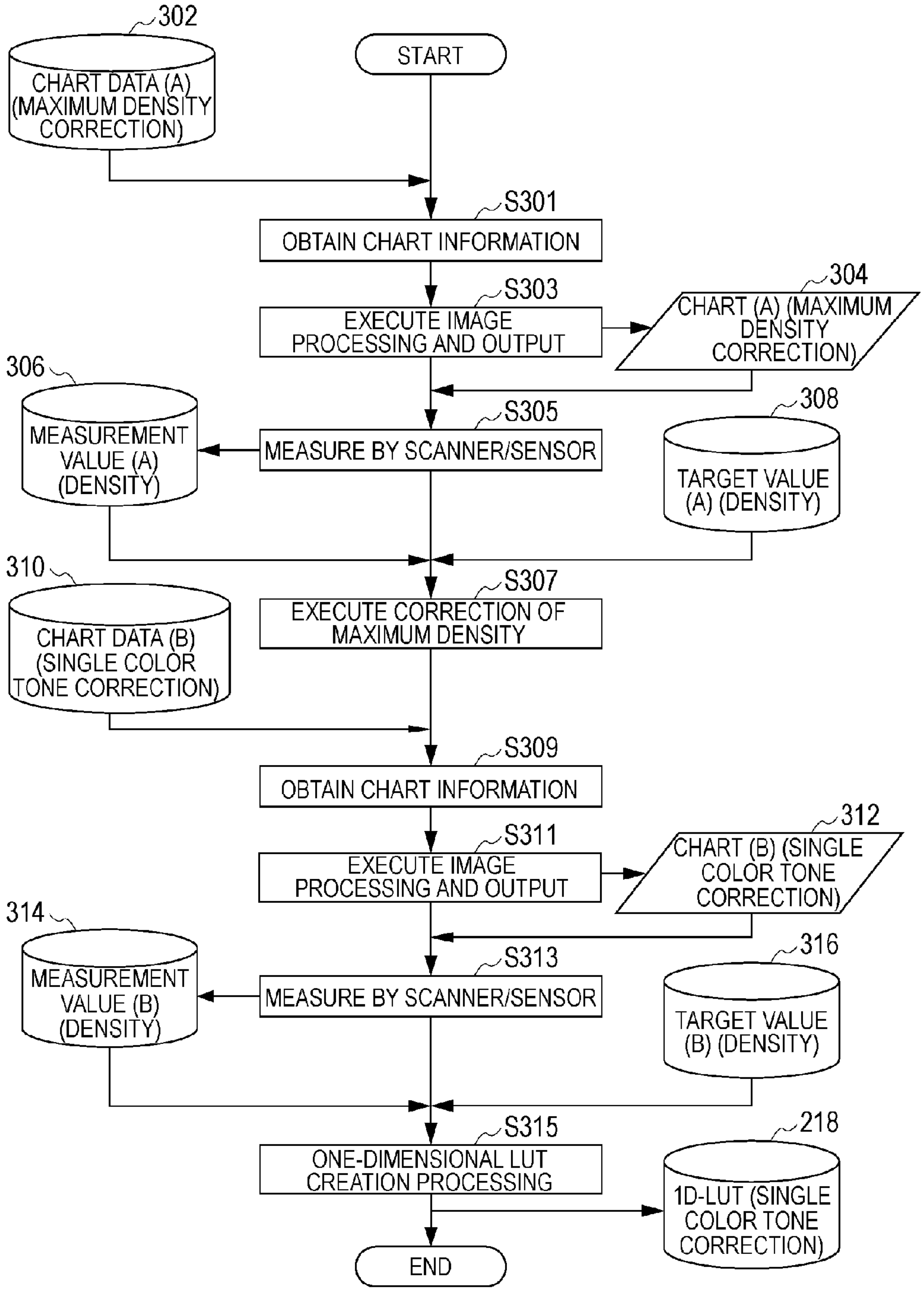
FIG. 3 is a flowchart of processing of a single color calibration.

With reference to FIG. 3, the "single color calibration" will now be described. The single color calibration is for correcting the tone characteristic, which is a reproduction characteristic, of an image that is formed with a single color and output by the printer 115. The single color calibration is executed to correct a single color reproduction characteristic, such as a maximum density characteristic and the tone characteristic.

FIG. 3 is a flowchart of processing to create the 1D-LUT 218 that is for correcting the single color tone characteristic. The process flow of FIG. 3 is achieved by the execution of the CPU 103, and the resultant 1D-LUT 218 is stored in the storage unit 121. In addition, an instruction to the user is displayed on an UI through the display unit 118 and an instruction from the user is received through the input unit 120.

In step S301, chart data (A) 302, stored in the storage unit 121, is obtained. The chart data (A) 302 is for correcting the maximum density of each single color and constituted by a signal value (for example, 255) from which maximum density data of "single colors" of C, M, Y, and K can be obtained.

Figure 5A:
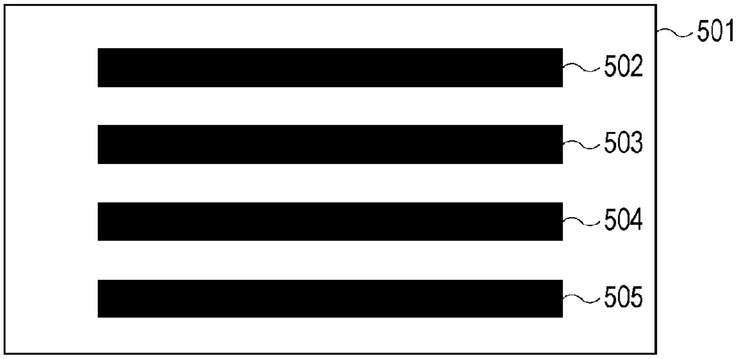
FIG. 5A is a diagram of a chart used for the single color calibration and the multi-color calibration.

Then, in step S303, the image processing is executed on the chart data (A) 302 by the image processor 114, so that a chart (A) 304 is printed by the printer 115. An example is illustrated in FIG. 5A. A reference numeral 501 of FIG. 5A refers to an example in a case where the chart data (A) 302 has been printed. Patches 502, 503, 504, and 505 are each printed with the maximum density of each color of C, M, Y, and K. Here, the image processor 114 performs the halftone processing in step S214 but does not perform the 1D-LUT correction processing in step S213 or the 4D-LUT correction processing in step S212.

Then, in step S305, the density of a print output material of the chart (A) 304 is measured with the scanner 119 or the sensor 127 in the measurer 126 to measure to obtain a measurement value (A) 306. The measurement value (A) 306 is a density value for each color of C, M, Y, and K. Then, in step S307, the measurement value (A) 306 and a predetermined target maximum density value (A) 308 are used to correct the maximum density of the measurement value (A) 306 for each color. Here, a device setting value for the printer 115, such as a laser output and a development bias, is adjusted such that the maximum density approaches the target value (A) 308.

Figure 5B:
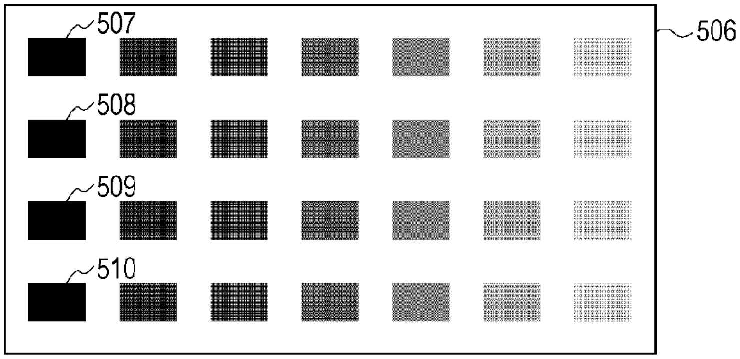
FIG. 5B is a diagram of a chart used for the single color calibration and the multi-color calibration.

Then, in step S309, chart data (B) 310, stored in the storage unit 121, is obtained. The chart data (B) 310 is constituted by a signal value of tone data of "single colors" of C, M, Y, and K. An example of a chart (B) 312, which includes a patch printed using the chart data (B) 310 on a print medium, is illustrated in FIG. 5B. A reference numeral 506 of FIG. 5B refers to an example of a print output material of the chart (B) 312, which includes a patch printed using the chart data (B) 310 on a print medium. Patches 507, 508, 509, and 510 and tone data that continues on the right hand side thereof in FIG. 5B are constituted by the tone data of each color of C, M, Y, and K.

Then, in step S311, the image processing is executed on the chart data (B) 310 by the image processor 114, so that a chart (B) 312 is printed by the printer 115. Here, the image processor 114 performs the halftone processing in step S214 but does not perform the 1D-LUT correction processing in step S213 or the 4D-LUT correction processing in step S212. Note that the printer 115 has been subjected to the maximum density correction in step S307 and, thus, can achieve a maximum density similar to the target value (A) 308.

Then, in step S313, measurement is performed with the scanner 119 or the sensor 127 to obtain a measurement value (B) 314. The measurement value (B) 314 is a density value that can be obtained from the tone of each color of C, M, Y, and K. Then, in step S315, the measurement value (B) 314 and a predetermined target value (B) 316 are used to create the 1D-LUT 218 that is for correcting the single color tone.

Figure 4:
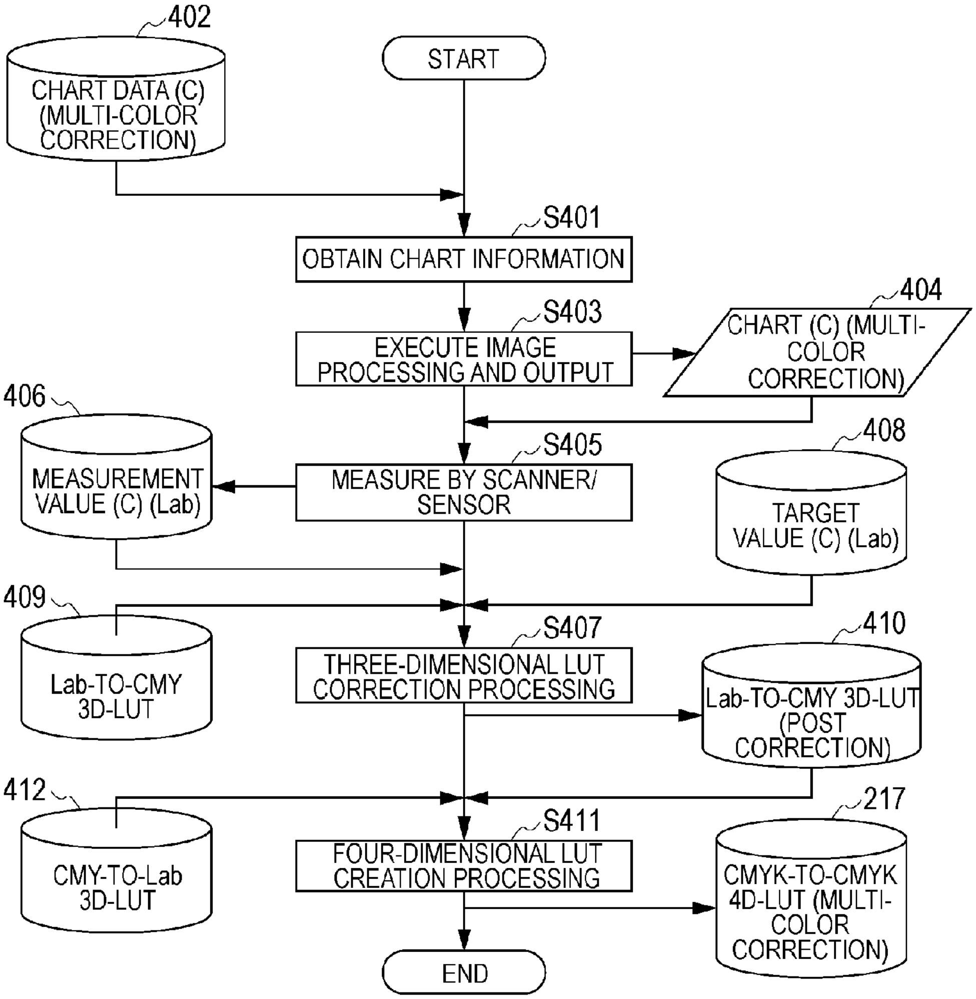
FIG. 4 is a flowchart of processing of a multi-color calibration.

With reference to FIG. 4, the "multi-color calibration" will now be described. The multi-color calibration is for correcting a reproduction characteristic of an image that is formed with a multi-color and output by the printer 115. The multi-color calibration is executed to correct the reproduction characteristic of the multi-color that is described by combining (overlaying) a plurality of color toners. A process flow to be described now is achieved by the execution of the CPU 103 in the controller 102. The resultant 4D-LUT 217 is stored in the storage unit 121. In addition, an instruction to the user is displayed on an UI through the display unit 118 and an instruction from the user is received through the input unit 120.

The multi-color calibration is to correct the multi-color printed by the printer 115 after an execution of the single color calibration. It is thus desirable that, immediately after the performance of the single color calibration, the multi-color calibration is performed.

Figure 5C:
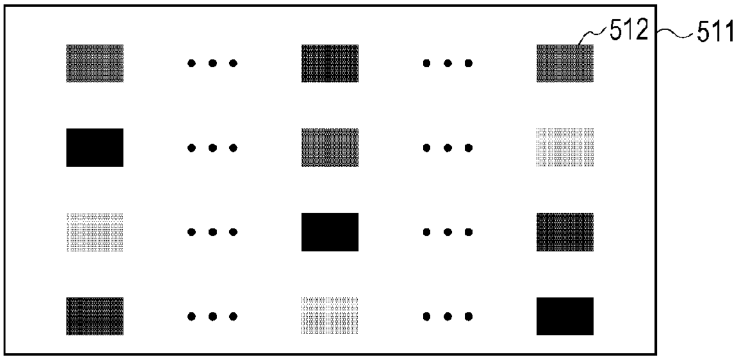
FIG. 5C is a diagram of a chart used for the single color calibration and the multi-color calibration.

In step S401, the information of chart data (C) 402, stored in the storage unit 121 and constituted by the "multi-color," is obtained. The chart data (C) 402 is data for correcting a multi-color and constituted by a signal value of the "multi-color" that is a combination of C, M, Y, and K. An example of a chart (C) 404, which includes a patch printed using the chart data (C) 402 on a print medium, is illustrated in FIG. 5C. A reference numeral 511 of FIG. 5C refers to an example in a case where the chart data (C) 402 has been printed. A patch 512 and all other patches printed on 511 are each constituted by a multi-color that is a combination of at least two of C, M, Y, and K.

Then, in step S403, the image processing is executed on the chart data (C) 402 by the image processor 114, so that the chart (C) 404 is printed by the printer 115. The multi-color calibration corrects a multi-color characteristic of a device after an execution of the single color calibration. Hence, the multi-color calibration uses the 1D-LUT 218, created during the execution of the single color calibration, for executing the image processing by the image processor 114.

Then, in step S405, the multi-color of a print output material of the chart (C) 404 is measured with the scanner 119 or the sensor 127 in the measurer 126 to obtain a measurement value (C) 406. The measurement value (C) 406 represents the multi-color characteristic of the printer 115 after the execution of the single color calibration. In addition, the measurement value (C) 406 is a value in a device independent color space, which is Lab in the present embodiments. When the scanner 119 is used, an RGB value is converted into a Lab value using a 3D-LUT that is not shown.

Then, in step S407, a Lab-to-CMY 3D-LUT 409, stored in the storage unit 121, is obtained. With a difference between the measurement value (C) 406 and a predetermined target value (C) 408 reflected, a Lab-to-CMY 3D-LUT (post correction) 410 is created. Here, a Lab-to-CMY 3D-LUT is a three-dimensional LUT that outputs a CMY value corresponding to a Lab value that has been input.

A specific method of the creation will now be described. A difference between the measurement value (C) 406 and the predetermined target value (C) 408 is added to a Lab value to be input into the Lab-to-CMY 3D-LUT 409. On the Lab value with the difference thus reflected, an interpolation calculation is executed using the Lab-to-CMY 3D-LUT 409. This creates a Lab-to-CMY 3D-LUT (post correction) 410.

Then, in step S411, a CMY-to-Lab 3D-LUT 412, stored in the storage unit 121, is obtained, and a calculation is performed with the Lab-to-CMY 3D-LUT (post correction) 410. This creates a CMYK-to-CMYK 4D-LUT 217. Here, a CMY-to-Lab 3D-LUT is a three-dimensional LUT that outputs a Lab value corresponding to a CMY value that has been input.

A specific method of creating the CMYK-to-CMYK 4D-LUT 217 will now be described. A CMY-to-CMY 3D-LUT is created from the CMY-to-Lab 3D-LUT 412 and the Lab-to-CMY 3D-LUT (post correction) 410. Then, the CMYK-to-CMYK 4D-LUT 217 is created such that an input value and an output value are identical for K. Here, a CMY-to-CMY 3D-LUT is a three-dimensional LUT that outputs a post correction CMY value corresponding to a CMY value that has been input.

(First Embodiment)

In the present embodiment, by using information on a sheet that has been selected upon issuance of an instruction to execute the multi-color calibration, information from a past execution of the single color calibration is referenced. In accordance with the result of the reference, it is decided whether the multi-color calibration should be executed as instructed or the single color calibration should be executed. A processing for this will now be described.

A status of an MFP 101 at a time when the single color calibration, described in FIG. 3, has been executed is stored as history information 601 in a storage unit 121. FIG. 6 is a diagram of exemplary items stored as the history information 601.

The history information 601, which is indicative of information from a past execution of the single color calibration, is managed for each sheet type. This is because the grammage, the surface nature, and the chromaticity of a sheet are closely related to the tone characteristic and the multi-color characteristic to be corrected through the calibrations. Hence, it is important to keep each LUT and a sheet type associated in order to guarantee image quality obtained through appropriate correction. In other words, a sheet type and a calibration target value are associated, and a target value differs in accordance with a sheet type. This is because a toner, when fixed, yields a different density and a different multi-color on a sheet with a different grammage, a different surface nature, and a different chromaticity of the sheet itself. For the reason as described above, an identical sheet type should be used for the calibrations. In other words, the type of a sheet (sheet type) to be used for the multi-color calibration should be identical to the type of a sheet (sheet type) that has been used for the single color calibration.

Sheet information 602 in FIG. 6 indicates the type of a sheet (sheet type) that has been used for an execution of the single color calibration processing and is stored by a CPU 103 in the storage unit 121.

The sheet type, indicated by the sheet information, includes a standard sheet that is recommended as a sheet to be used for executions of the single color calibration and the multi-color calibration. The sheet type also includes other various sheet types that are categorized into small groups in accordance with the thickness, the grammage, the surface nature, the color, and the glossiness of a sheet.

Registration date and time 603 indicates the date and time the single color calibration has been executed, and is stored by the CPU 103 in the storage unit 121.

Environment information 604 indicates an environmental condition at a time when the single color calibration has been executed, and is stored by the CPU 103 in the storage unit 121. As an environmental condition, for example, temperatures inside a printer are categorized into three regions, namely, a temperature at 28 degrees C. or above is categorized into a high temperature region, a temperature below 28 degrees C. but not below 10 degrees C. into a standard air temperature region, and a temperature below 10 degrees C. into a low temperature region. Also, humidity is categorized into three classes, namely, humidity at 80% or above is categorized into a high humidity class, humidity below 80% but not below 40% into a standard humidity class, and humidity below 40% into a low humidity class. Environmental conditions are then categorized into nine categories by combinations of the temperature and the humidity, and a value corresponding to each category is provided.

During an execution of the single color calibration, a temperature sensor and a humidity sensor (not shown) inside a printer 115 are used to measure an air temperature and humidity. It is determined which value, indicative of an environment categorized in advance, a resultant measurement applies to. A resultant determination is stored as the environment information by the CPU 103 in the storage unit 121.

The number of output sheets 605 indicates a count value indicative of the total number of sheets used for printing since a previous execution of the single color calibration before a present execution of the single color calibration. The number of output sheets 605 is stored by the CPU 103 in the storage unit 121.

Figure 7:
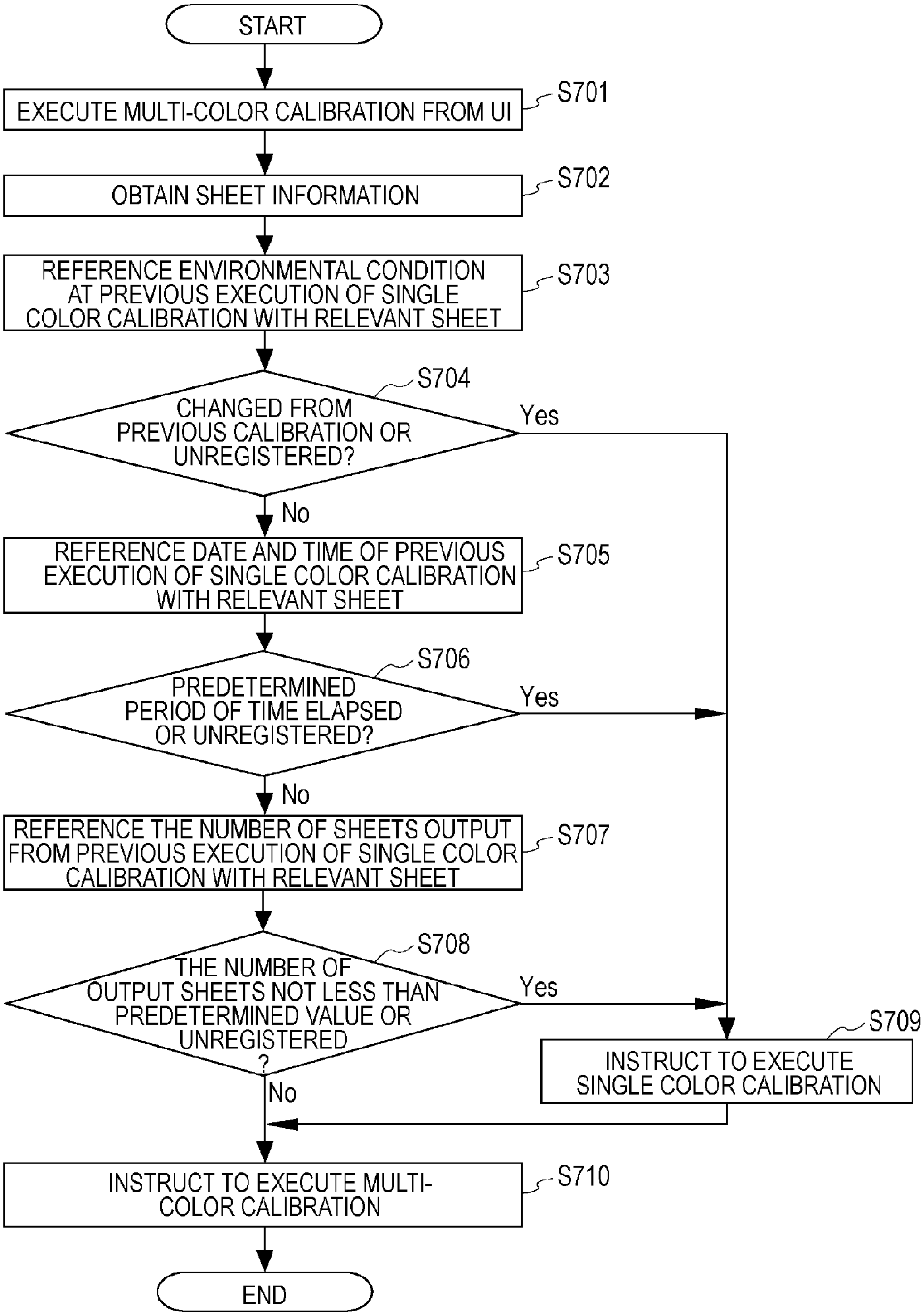
FIG. 7 is an exemplary flowchart of processing according to the first embodiment.

FIG. 7 is an exemplary process flowchart to determine whether or not to execute the single color calibration, described with reference to FIG. 3, upon issuance of an instruction to execute the multi-color calibration, described with reference to FIG. 4. A process flow to be described now is achieved when the CPU 103 in a controller 102 obtains and executes the history information 601 stored in the storage unit 121. In addition, an instruction to a user is displayed on an UI through a display unit 118 and an instruction from the user is received through an input unit 120.

Figure 8A:
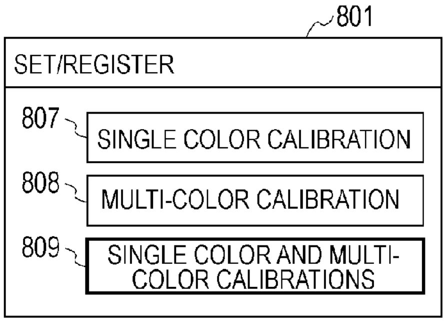
FIG. 8A is a diagram of an example UI displayed on a display unit 118 according to the first embodiment.

In step S701, the display unit 118 displays a menu 801, illustrated in FIG. 8A, to allow selection of the type of calibration to be executed.

The menu 801 includes buttons 807 to 809 to allow any of a plurality of types of calibrations to be executed.

The button 809 is pressed for executing the single color calibration and then the multi-color calibration. If the button 809 is selected, the single color calibration is started, and when the single color calibration has been executed, the multi-color calibration is started.

Specifically, when the single color calibration is finished, a chart (C) 404 for the multi-color calibration is output to allow the multi-color calibration to be started. Alternatively, a button to start the multi-color calibration may be displayed on a screen for the user, and when the button is pressed by the user, the multi-color calibration may be started.

If the button 807 is selected, the single color calibration alone is executed. Similarly, if the button 808 is selected, the multi-color calibration alone is executed.

The separate buttons are provided for the single color calibration and the multi-color calibration for a reason to be described now. In order to output the chart (C) 404, which is to be used during an execution of the multi-color calibration, a 1D-LUT 218, which has been created by the single color calibration, is used. Thus, it is desirable that the multi-color calibration is performed immediately after the single color calibration. The execution of the two types of calibrations, however, causes the user to spend excessive time for processing of the calibrations.

In order to reduce the processing time, either the single color calibration or the multi-color calibration is allowed to be executed in a manner depending on a usage environment of the user. This leads to different frequencies of executing the calibrations. For example, a user with ample opportunity to perform black-and-white printing can obtain a certain level of the image quality by merely executing the single color calibration, resulting in a reduced frequency with which the multi-color calibration is executed. A user with ample opportunity to perform color printing with a multi-color, such as a photograph, would wish to correct the accuracy of the multi-color, resulting in an increased frequency with which the multi-color calibration is executed.

When the button 808 is pressed through the display unit 118 that displays the menu 801, the input unit 120 receives an instruction to execute the multi-color calibration.

Figure 8B:
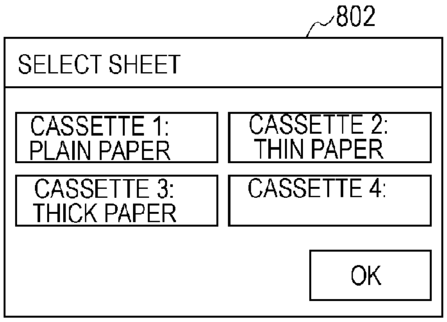
FIG. 8B is a diagram of an example UI displayed on the display unit 118 according to the first embodiment.

In step S702, the display unit 118 displays a menu 802, illustrated in FIG. 8B, to allow selection of the type of a sheet to be used during the execution of the multi-color calibration. The input unit 120 receives from the user an instruction concerning the sheet information indicative of the type of a sheet (sheet type) to be used during the execution of the multi-color calibration (a sheet to be used for outputting the chart).

In step S703, the CPU 103 references, on the basis of the sheet information obtained in step S702, the environment information 604 corresponding to the sheet type instructed in step S702, from the history information 601 stored in the storage unit 121.

In step S704, the temperature sensor and the humidity sensor inside the printer 115 measure a present air temperature and present humidity. The CPU 103, then, compares the data of the environment information 604 obtained in step S703 and data measured by the sensors. In other words, values indicative of environments of these two sets of data are compared with each other. It is determined, by this comparison, whether or not an environment has changed since a previous execution of the single color calibration using a sheet categorized in the sheet type instructed in step S702. If a difference between the values indicative of the environments is more than a predetermined threshold, it is determined that the environment has changed and the process moves on to step S709. If a difference between the values indicative of the environments is less than the predetermined threshold, it is determined that the environment has not changed, and the process moves on to step S705. If the single color calibration has not been executed in the past using a sheet categorized in the sheet type instructed in step S702, in other words, if the sheet type is not stored in the history information 601, the process moves on to step S709.

In step S705, the CPU 103 references, on the basis of the sheet information obtained in step S702, the registration date and time 603, indicative of when the single color calibration has been executed using a sheet categorized in the sheet type instructed in step S702, from the history information 601 stored in the storage unit 121.

In step S706, the CPU 103 obtains a period of time elapsed from the execution of the single color calibration, which has used a sheet categorized in the sheet type instructed in step S702, to the present on the basis of the data of the registration date and time 603 obtained in step S705 and the present date and time. The CPU 103 then compares the period of time obtained and a threshold stored in advance in the storage unit 121 to determine whether or not a predetermined period of time has elapsed from the previous execution of the single color calibration. If the period of time elapsed from the previous execution of the single color calibration is more than the threshold, the process moves on to step S709. If the period of time elapsed from the previous execution of the single color calibration is less than the threshold, the process moves on to step S707. Similarly to step S704, if the single color calibration has not been executed in the past using a sheet categorized in the sheet type instructed in step S702, in other words, if the sheet type is not stored in the history information 601, the process moves on to step S709.

In step S707, the CPU 103 references, on the basis of the sheet information obtained in step S702, the number of output sheets 605, indicative of how many sheets categorized in the sheet type indicated in the sheet information have been used for printing until the previous execution of the single color calibration, from the history information 601.

In step S708, the CPU 103 obtains, using the data of the number of output sheets 605 obtained in step S707 and the present number of output sheets (count value), the number of sheets output from the previous execution of the single color calibration to the present. The CPU 103 then compares the number of output sheets obtained and a threshold stored in advance in the storage unit 121 to determine whether or not the number of sheets, which are categorized in the sheet type designated in step S702 and have been used for printing from the previous execution of the single color calibration to the present, is more than the threshold. If it is determined that the number of sheets used for the printing is more than the threshold, the process moves on to step S709. If it is determined that the number of sheets used for the printing is less than the threshold, the process moves on to step S710. Similarly to step S704, if the single color calibration has not been executed in the past using a sheet categorized in the sheet type instructed in step S702, in other words, if the sheet type is not stored in the history information 601, the process moves on to step S709.

Figure 8C:
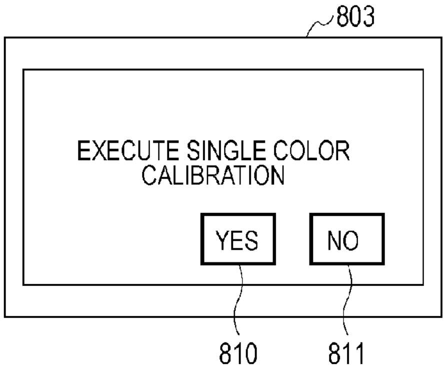
FIG. 8C is a diagram of an example UI displayed on the display unit 118 according to the first embodiment.
Figure 8D:
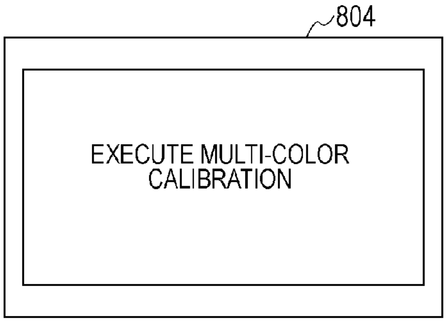
FIG. 8D is a diagram of an example UI displayed on the display unit 118 according to the first embodiment.
Figure 8E:
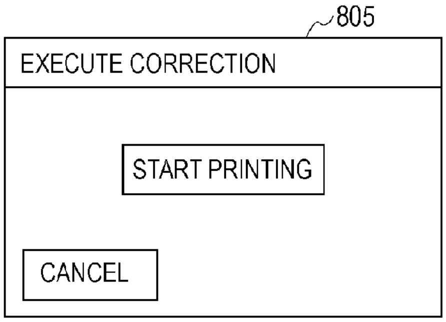
FIG. 8E is a diagram of an example UI displayed on the display unit 118 according to the first embodiment.
Figure 8F:
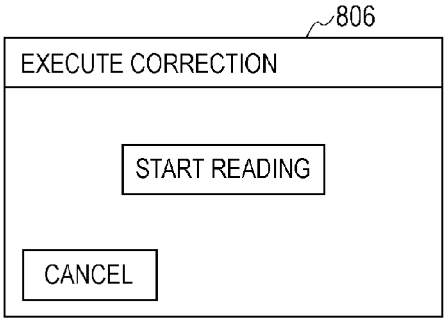
FIG. 8F is a diagram of an example UI displayed on the display unit 118 according to the first embodiment.

In step S709, the display unit 118 displays a screen 803, illustrated in FIG. 8C, to prompt the user to execute the single color calibration. Upon pressing of an execute button 810 for the single color calibration, the display unit 118 displays a screen 805 and a screen 806, illustrated in FIGS. 8E and 8F, respectively, and the CPU 103 executes the single color calibration described with reference to FIG. 3. Alternatively, the display unit 118 may automatically display the screen 805 and the screen 806 and the execution of the single color calibration may be forced without the pressing of the execute button 810.

If the single color calibration is instructed in step S709 or if No is determined in step S708, the process moves on to step S710. In addition, if the execution of the single color calibration is rejected (by pressing the button 811 in the screen 803 illustrated in FIG. 8C) in step S709, the single color calibration is not executed, and the process moves on to step S710. The display unit 118 displays a screen 804 to prompt the user to execute the multi-color calibration. The display unit 118, then, displays the screen 805 and the screen 806 and the CPU 103 executes the multi-color calibration described with reference to FIG. 4.

Note that the thresholds used for the determinations in steps S704, S706, and S708 may be changed in a manner depending on a sheet type.

As described above, in the present embodiment, upon issuance of an instruction to execute the multi-color calibration, the history information is referenced. The history information is on the MFP 101 at a time when a sheet, categorized in the sheet type instructed to be used for the execution of the multi-color calibration, has been used for a previous execution of the single color calibration. In accordance with this information, it is decided whether the multi-color calibration should be executed, or the single color calibration should be executed in advance of the execution of the multi-color calibration.

Deciding in this manner which calibration from the plurality of types of calibrations, namely the single color calibration and the multi-color calibration, should be executed prevents the calibrations from being executed too often. This can reduce time and effort taken to execute the calibrations, thereby improving usability.

(Second Embodiment)

In the first embodiment, the process flow has been described in which it is determined, using the history information 601, whether or not to execute the single color calibration upon instruction to execute the multi-color calibration.

In some cases with a printer 115 having a stable single color density (tone characteristic), however, merely executing the multi-color calibration may provide an appropriate result of correction, even if, as a result of the determination described in the first embodiment, it is determined that the single color calibration should be executed.

The present embodiment brings focus to this point, and adds, to the history information 601, a density history 1001 from an execution of the single color calibration.

Using the density history 1001 and also considering a density variation measured during a past execution of the single color calibration, it is determined whether or not to execute the single color calibration upon instruction to execute the multi-color calibration.

A system block diagram of an image processing apparatus used in the present embodiment is similar to that used in the first embodiment, and, hence, the description thereof will not be repeated.

In addition, the execution flows of the single color calibration and the multi-color calibration in the present embodiment are similar to those in the first embodiment, and hence, the description thereof will not be repeated.

FIG. 10 is a diagram of the density history 1001 added to the history information 601. The density history 1001 is, similarly to other items, managed for each sheet type in the history information 601.

Tone data 1002 corresponds to the chart data (B) 310 in FIG. 3. Specifically, the tone data 1002 corresponds to the tone data for outputting the patches 507, 508, 509, and 510 and patches that continue on the right hand side thereof in 506 of FIG. 5B. The tone data 1002 is stored by a CPU 103 in a storage unit 121.

This data is stored in the history information 601 every time the single color calibration is executed.

A measurement value (density) 1003 corresponds to the density value (the measurement value (B) 314 in FIG. 3) obtained, by measuring the chart (B) 312 using a scanner 119 or a sensor 127, from the tone data of each color of C, M, Y, and K. The measurement value (density) 1003 is stored by the CPU 103 in the storage unit 121.

Figure 9:
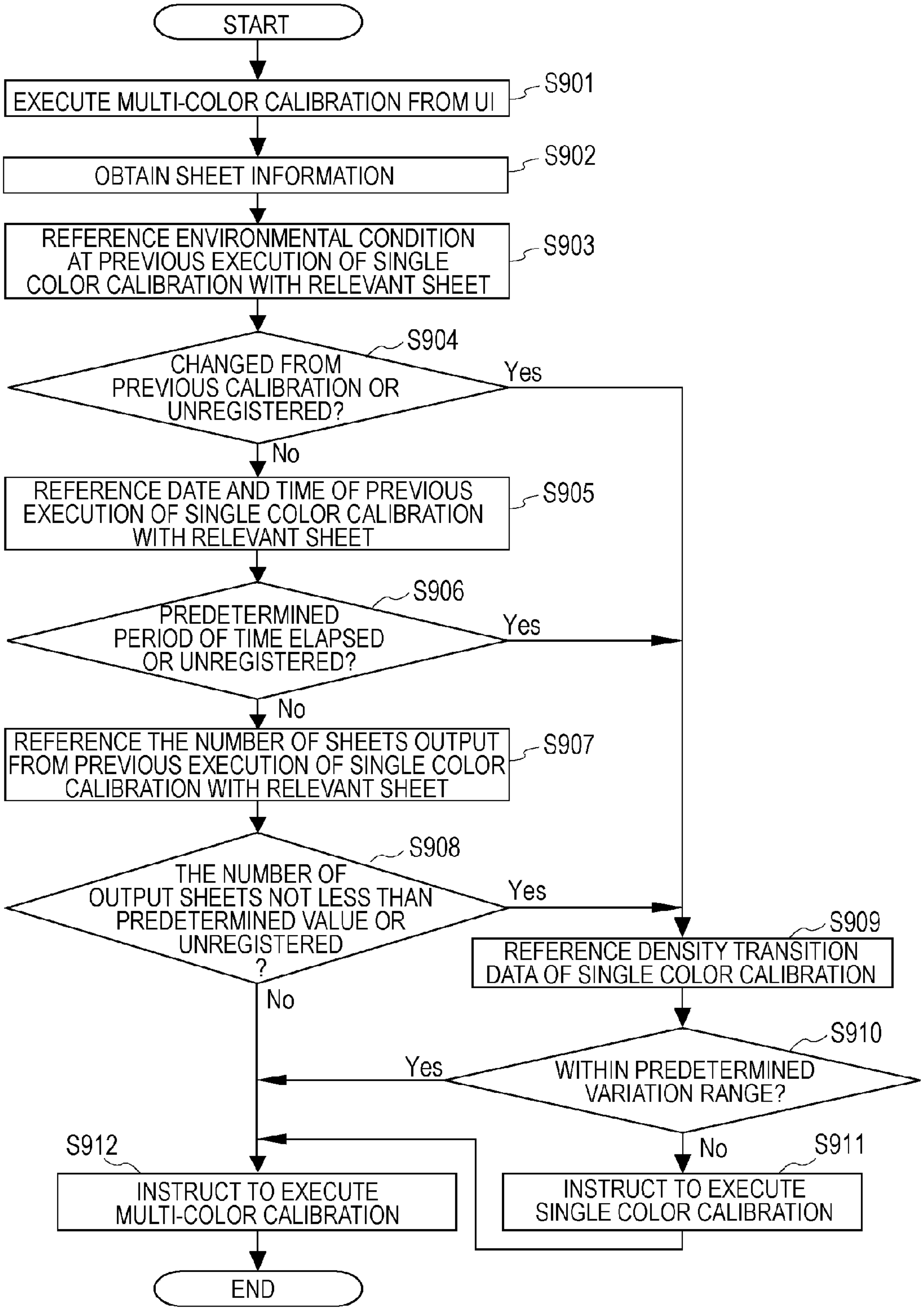
FIG. 9 is an exemplary flowchart of processing according to a second embodiment.

FIG. 9 is an exemplary process flowchart to determine whether or not to also execute the single color calibration upon issuance of an instruction to execute the multi-color calibration. A process to be described now is achieved when the CPU 103 in a controller 102 obtains and executes the history information 601 stored in the storage unit 121. In addition, an instruction to a user is displayed on an UI through a display unit 118 and an instruction from the user is received through an input unit 120.

Steps S901 to S908 are similar to steps S701 to S708 in the first embodiment, and hence, the description thereof will not be repeated.

In step S909, the CPU 103 references, on the basis of the sheet information obtained in step S902, the density history 1001 corresponding to the sheet type instructed in step S902, from the history information 601 stored in the storage unit 121.

Figure 11:
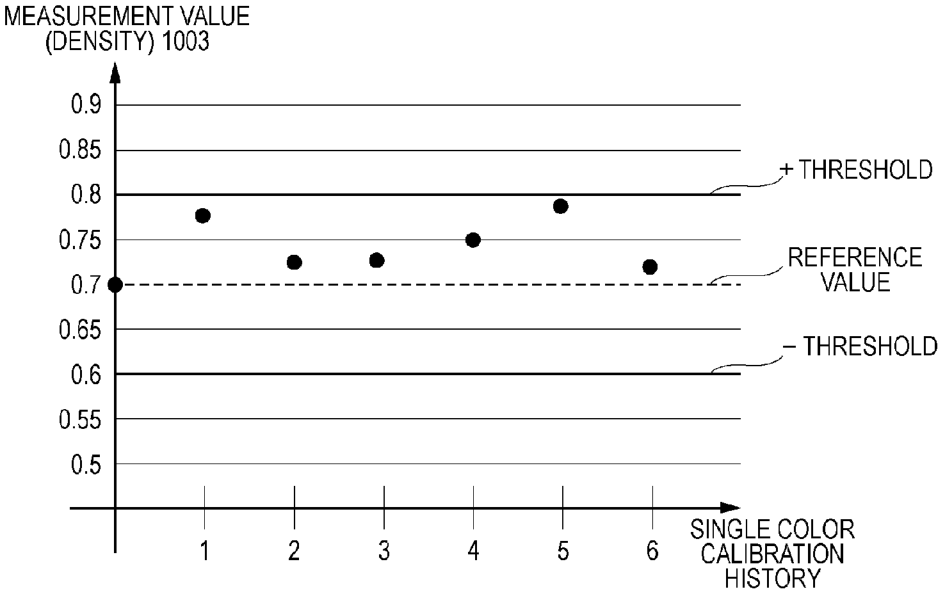
FIG. 11 is a graph of an example of density transition in step S910 according to the second embodiment.

In step S910, the CPU 103 obtains a density variation from the density history 1001 obtained in step S902. The density variation that has been obtained is compared against a threshold stored in advance in the storage unit 121. In this way, it is determined whether or not the single color density variation that has been obtained is within a predetermined variation range. In other words, it is determined whether or not the level of single color density variation measured during a past execution of the single color calibration is within a predetermined range of values. For example, as illustrated in FIG. 11, this can be determined on the basis of whether or not the measurement value (density) 1003 of the density history 1001 is within a reference value (as an example, a theoretical density value corresponding to the tone data 1002)±a threshold. If it is determined that the level of variation is less than a threshold, the process moves on to step S912. If it is determined that the level of variation is more than the threshold, the process moves on to step S911.

Steps S911 to S912 are similar to steps S709 to S710 in the first embodiment, and hence, the description thereof will not be repeated.

As described above, in the present embodiment, the density history from an execution of the single color calibration is added to the history information. It is, then, determined, with a density variation obtained from the past execution of the single color calibration also taken into consideration, whether or not to execute the single color calibration upon instruction to execute the multi-color calibration.

In this way, for a printer for which a characteristic to be corrected by the single color calibration is stable, in other words, for a printer having a stable single color density (tone characteristic), the frequency of executing the single color calibration is expected to be reduced in comparison with the first embodiment. Hence, the usability can be further improved.

(Third Embodiment)

In the second embodiment, the process flow has been described in which the density history is added to the history information so that a density variation obtained during a past execution of the single color calibration is taken into consideration and then it is determined whether or not to execute the single color calibration upon instruction to execute the multi-color calibration. This can reduce the number of single color calibrations to be executed for a printer for which a characteristic to be corrected by the single color calibration is stable.

In some cases, even when a user designates the multi-color calibration, an appropriate result of correction may be obtained by executing the single color calibration without executing the multi-color calibration.

The present embodiment brings focus to this point, and retains, in addition to the history information 601, a color history 1301 from a past execution of the multi-color calibration.

This color history 1301 is also stored for each type of a sheet (sheet type) used for a past execution of the multi-color calibration.

It is, then, determined, with a multi-color variation obtained from the past execution of the multi-color calibration also taken into consideration, whether or not to execute the single color calibration alone without executing the multi-color calibration even when an instruction has been issued to execute the multi-color calibration.

A system block diagram of an image processing apparatus used in the present embodiment is similar to that used in the first embodiment, and, hence, the description thereof will not be repeated.

In addition, the execution flows of the single color calibration and the multi-color calibration in the present embodiment are similar to those used in the first embodiment, and hence, the description thereof will not be repeated.

FIG. 13 is a diagram of the color history 1301 added to the history information 601. The color history 1301 is, similarly to other items, managed for each sheet type in the history information 601.

Multi-color chart data 1302 corresponds to the chart data (C) 402 in FIG. 4. Specifically, the multi-color chart data 1302 corresponds to the data for outputting patches including the patch 512 in FIG. 5C. The multi-color chart data 1302 is stored by a CPU 103 in a storage unit 121.

This data is stored in the history information 601 every time the multi-color calibration is executed.

A measurement value (L*) 1303, a measurement value (a*) 1304, and a measurement value (b*) 1305 correspond to the measurement value (C) 406 in FIG. 4. These measurement values correspond to color values obtained from data by measuring a chart (C) 404 using a scanner 119 or a sensor 127. These measurement values are stored by the CPU 103 in the storage unit 121.

Figure 12:
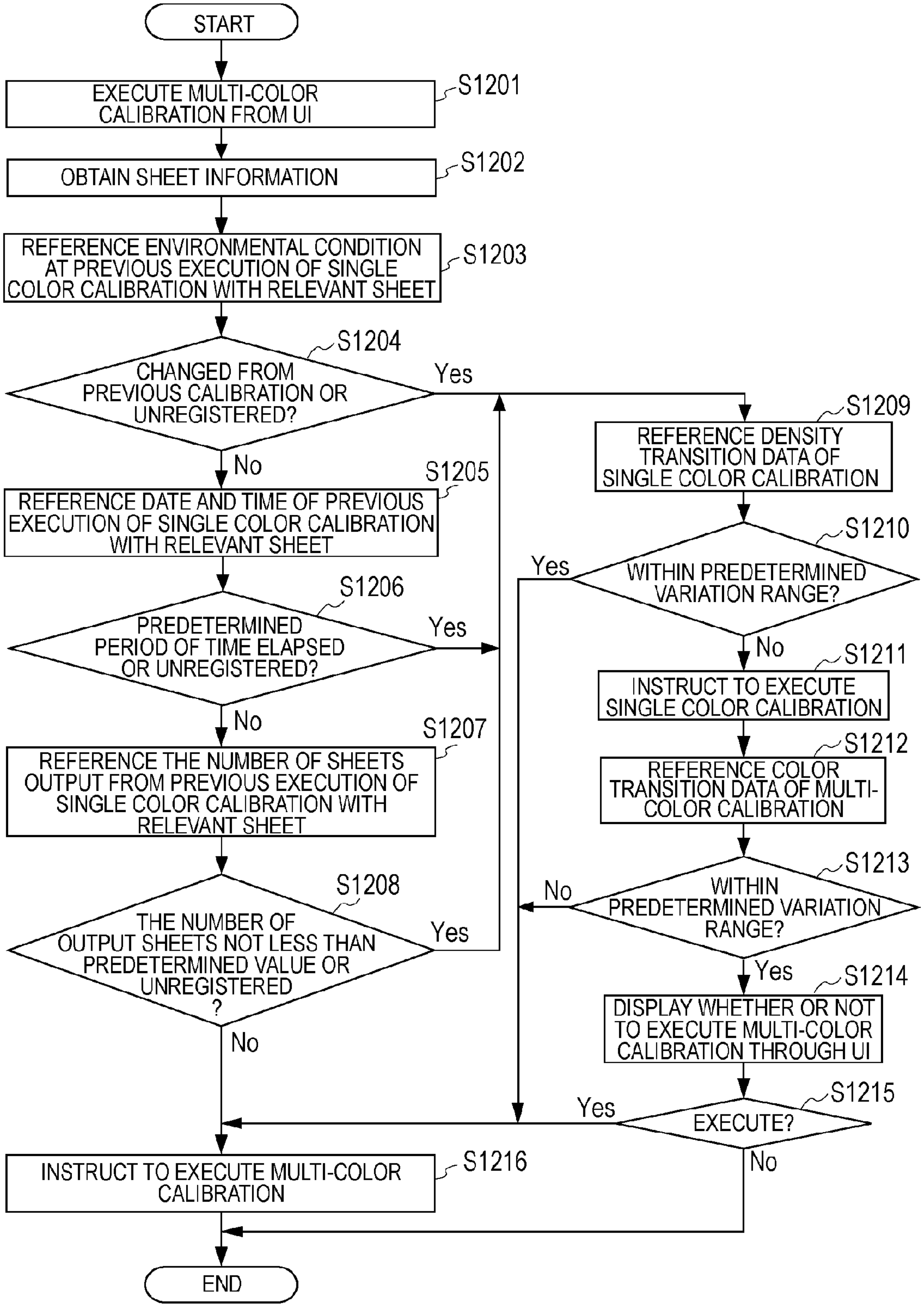
FIG. 12 is an exemplary flowchart of processing according to a third embodiment.

FIG. 12 is an exemplary process flowchart to determine whether or not to execute the single color calibration alone upon issuance of an instruction to execute the multi-color calibration. A process to be described now is achieved when the CPU 103 in a controller 102 obtains and executes the history information 601 stored in the storage unit 121. In addition, an instruction to a user is displayed on an UI through a display unit 118 and an instruction from the user is received through an input unit 120.

Steps S1201 to S1211 are similar to steps S901 to S911 described in the second embodiment, and hence, the description thereof will not be repeated.

In step S1212, the CPU 103 references, on the basis of the sheet information obtained in step S1202, the color history 1301 of a sheet categorized in the sheet type instructed.

In step S1213, the CPU 103 obtains a color variation thus far from the color history 1301 obtained in step S1212. The color variation that has been obtained is compared against a threshold stored in advance in the storage unit 121. In this way, it is determined whether or not the color variation that has been obtained is within a predetermined variation range. In other words, it is determined whether or not the level of color variation of a multi-color measured during a past execution of the multi-color calibration is within a predetermined value. For example, this can be determined on the basis of whether or not the measurement value (L*) 1303, the measurement value (a*) 1304, and the measurement value (b*) 1305 of the color history 1301 are each within a reference value (as an example, a theoretical L*a*b* value corresponding to the multi-color chart data 1302)±a threshold. If it is determined that the level of variation is less than a threshold, the process moves on to step S1214. If it is determined that the level of variation is more than the threshold, the process moves on to step S1216.

Figure 14:
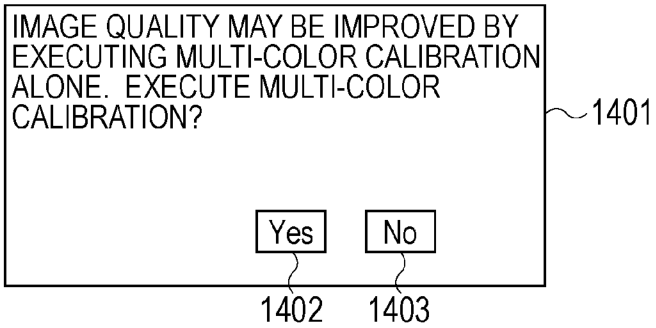
FIG. 14 is a diagram of an example UI displayed on the display unit 118 according to the third embodiment.

In step S1214, the display unit 118 notifies the user that an improvement may be obtained with an execution of the single color calibration alone. Through an UI, the user is notified of an option of determining whether or not to execute the multi-color calibration. An example of this UI is illustrated in FIG. 14. Reference numeral 1401 refers to a display to notify the user that the image quality may be improved by merely executing the single color calibration.

Then, in step S1215, an instruction on whether or not to execute the multi-color calibration is received through the input unit 120. If a button 1402 in FIG. 14 is pressed so that Yes is determined, the process moves on to step S1216. If a button 1403 in FIG. 14 is pressed so that No is determined, the process is finished without executing the multi-color calibration instructed in step S1201.

Step S1216 is similar to step S912, and, hence, the description thereof will not be repeated.

The color history 1301 may include, instead of the three items, namely the measurement value (L*) 1303, the measurement value (a*) 1304, and the measurement value (b*) 1305, a length of vector data that represents a difference from a value obtained during a previous calibration. In this way, upon instruction to execute the multi-color calibration, if the length of the vector data is within a predetermined range, the single color calibration alone may be executed without executing the multi-color calibration.

In addition, the threshold stored in advance in the storage unit 121 may be set differently for each color in accordance with vision characteristics of humans. For example, a threshold for a color value of gray may be reduced so that the multi-color calibration is controlled and executed even with a low level of variation, while a threshold for another color may be increased.

As described above, in the present embodiment, the color history from an execution of the multi-color calibration is stored in addition to the history information from an execution of the single color calibration. It is, then, determined, with a color variation also taken into consideration, whether or not to execute the single color calibration alone without executing the multi-color calibration upon issuance of an instruction to execute the multi-color calibration.

In this way, for a printer for which an appropriate multi-color characteristic can be obtained by executing the single color calibration to correct a single color density (tone characteristic) alone, the calibration is completed only by executing the single color calibration. Hence, the usability can be further improved.

(Other Embodiments)

An embodiment of the present invention is also realized by executing processing as described hereinafter. That is, software (a program) for realizing the functions of one or more embodiments described above is supplied to a system or an apparatus through a network or various types of storage medium, so that a computer (or a CPU, MPU, or the like) of the system or the apparatus reads out and executes the program.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-143139, filed Jun. 26, 2012, which is hereby incorporated by reference herein in its entirety.

What is claimed is:

1. An image processing apparatus, comprising:
an image forming unit configured to form an image;
a measuring unit configured to measure the image;
a controlling unit configured to control an execution of a single color calibration and an execution of a multi-color calibration, wherein:
the single color calibration being configured to correct a reproduction characteristic of the image, the correction being performed according to a result of measurement performed by the measuring unit on a single color image formed by the image forming unit with a recording material of a single color, and
the multi-color calibration being configured to correct the reproduction characteristic of the image, the correction being performed according to a result of measurement performed by the measuring unit on a multi-color image made of a combination of recording materials of a plurality of colors formed by the image forming unit;
an obtaining unit configured to obtain history information of the single color calibration executed by the controlling unit; and
a deciding unit configured to decides in accordance with the history information of the single color calibration one of a first color calibration case and a second color calibration case, and wherein the controlling unit executes in the first color calibration case the multi-color calibration, and in the second color calibration case both of the single color and the multi-color calibrations are executed.

2. The image processing apparatus according to claim 1, wherein
the deciding unit references the history information to decide one of the first color calibration case and the second color calibration case is upon issuance of an instruction to execute the multi-color calibration.

3. The image processing apparatus according to claim 1, wherein
the history information is stored for each sheet type and indicates a status of the image processing apparatus at a time when the at least one of the single color calibration and the multi-color calibration has been executed with a sheet categorized in the sheet type.

4. The image processing apparatus according to claim 1, wherein the deciding unit references the history information and, in a case where it is determined that a period of time elapsed from a previous execution of the single color calibration is more than a threshold, decides that the single color and the multi-color calibrations are executed, and in a case where it is determined that the period of time elapsed is less than the threshold, decides that the multi-color calibration be executed.

5. The image processing apparatus according to claim 1, wherein the deciding unit references the history information and, in a case where it is determined that a difference from a value indicative of an environment at a time of a previous execution of the single color calibration is more than a threshold, decides that the single color and the multi-color calibrations are executed, and in a case where it is determined that the difference from the value indicative of the environment is less than the threshold, decides that the multi-color calibration be executed.

6. The image processing apparatus according to claim 1, wherein the deciding unit references the history information and, in a case where it is determined that the number of sheets output from a previous execution of the single color calibration is more than a threshold, decides that the single color and the multi-color calibrations are executed, and in a case where it is determined that the number of sheets output is less than the threshold, decides that the multi-color calibration be executed.

7. The image processing apparatus according to claim 1, wherein the deciding unit references the history information and, in a case where it is determined that a level of variation of a measurement value obtained from every execution of the single color calibration is more than a threshold, decides that the single color and the multi-color calibrations are to be executed, and in a case where it is determined that the level of variation of the measurement value is less than the threshold, decides that the multi-color calibration be executed.

8. The image processing apparatus according to claim 1, wherein the deciding unit decides that the single color and the multi-color calibrations are executed in a case where the history information of the at least one of the calibrations, which has been executed, is not obtained by the obtaining unit.

9. The image processing apparatus according to claim 1, wherein in a case where the deciding unit decides that the single color and the multi-color calibrations are to be executed, the controlling unit performs control such that the multi-color calibration is executed after the single color calibration has been executed.

10. The image processing apparatus according to claim 1, wherein upon input of an instruction to execute the multi-color calibration, and upon a decision by the deciding unit that both the single color and the multi-color calibrations are executed that a prompt is displayed allowing a user to approve or reject the execution of the single color calibration;

in the case of the user rejecting the execution of the single color calibration then the multi-color calibration is performed without the single color calibration; and in the case of the user accepting the execution of the single color calibration then the multi-color calibration is performed with the single color calibration.

11. The image processing apparatus according to claim 1, wherein the history information includes one or more historical records;

each historical record includes information pertaining to a particular calibration event including at least:

a historical sheet type that was used for the particular calibration event;

historical environment information includes at least one or more values that are indicative of the environmental condition when the particular calibration event occurs; and a historical number of output sheets when the particular calibration event occurs and/or a historical date and/or time of the particular calibration event;

the obtaining unit is further configured to obtain:

a current sheet type on which the image is to be formed by the image forming unit after calibration is performed;

a current environment information includes at least one or more values indicative of a current environmental condition; and a current sheet count and/or current date;

wherein the deciding unit limits the history information that is used in the deciding to a specific historical record in which:

the current sheet type is associated with the historical sheet type of the specific historical record;

the current environmental information is within a specified range of the historical environmental condition of the specific historical record;

the current sheet count that is closest to the historical number of output sheets or the most recent historical record.

12. The image processing apparatus according to claim 11, wherein the historical environment information includes at least a historical temperature indicative of temperature at the particular calibration event and a historical humidity indicative of humidity at the particular calibration event; and the current environment information includes at least a current temperature and a current humidity.

13. The image processing apparatus according to claim 11, wherein the deciding unit calculates a sheet count difference value the historical sheet count of the specific historical record and the current sheet count and compares it to a sheet count threshold;

in the case where the sheet count difference value is greater than the sheet count threshold then both of the single color and the multi-color calibrations are executed;

in the case where the sheet count difference value is less than the sheet count threshold then the multi-color calibration is executed.

14. The image processing apparatus according to claim 11, wherein the deciding unit calculates a period the historical date and/or time of the specific historical record and a current date and/or time and compares it to a period threshold;

in the case where the sheet count difference value is greater than the period threshold then both of the single color and the multi-color calibrations are executed;

in the case where the sheet count difference value is less than the period threshold then the multi-color calibration is executed.

15. An image processing method for controlling an image processing apparatus that includes: an image forming unit configured to form an image; and a measuring unit configured to measure the image, comprising:

controlling an execution of a single color calibration and an execution of a multi-color calibration, wherein:

the single color calibration being configured to correct reproduction characteristic of the image, the correction being performed according to a result of measurement performed by the measuring on a single color image formed by the image-forming with a recording material of a single color, and the multi-color calibration being configured to correct the reproduction characteristic of the image, the correction being performed according to a result of measurement performed by the measuring on a multi-color image made of a combination of recording materials of a plurality of colors formed by the image forming unit;

obtaining history information of the single color calibration; and deciding in accordance with the history information of the single color calibration one of a first color calibration case and a second color calibration case, and wherein the controlling executes in the first color calibration case the multi-color calibration, and in the second color calibration case both of the single color and the multi-color calibrations are executed.

16. The image processing method according to claim 15, wherein the deciding references the history information to decide one of the first color calibration case and the second color calibration case is upon issuance of an instruction to execute the multi-color calibration.

17. The image processing method according to claim 15, wherein the history information is stored for each sheet type and indicates a status of an image processing apparatus at a time when the at least one of the single color calibration and the multi-color calibration has been executed with a sheet categorized in the sheet type.

18. The image processing method according to claim 15, wherein the deciding references the history information and, in a case where it is determined that a period of time elapsed from a previous execution of the single color calibration is more than a threshold, decides that the single color and the multi-color calibrations are executed, and in a case where it is determined that the period of time elapsed is less than the threshold, decides that the multi-color calibration be executed.

19. The image processing method according to claim 15, wherein the deciding references the history information and, in a case where it is determined that a difference from a value indicative of an environment at a time of a previous execution of the single color calibration is more than a threshold, decides that the single color and the multi-color calibrations are executed, and in a case where it is determined that the difference from the value indicative of the environment is less than the threshold, decides that the multi-color calibration be executed.

20. The image processing method according to claim 15, wherein the deciding references the history information and, in a case where it is determined that the number of sheets output from a previous execution of the single color calibration is more than a threshold, decides that the single color and the multi-color calibrations are executed, and in a case where it is determined that the number of sheets output is less than the threshold, decides that the multi-color calibration be executed.

21. The image processing method according to claim 15, wherein in a case where both the single color and the multi-color calibrations are to be executed, the multi-color calibration is executed after the single color calibration has been executed.

22. The image processing method according to claim 15, wherein upon input of an instruction to execute the multi-color calibration, and upon a decision by the deciding unit that both the single color and the multi-color calibrations are executed that a prompt is displayed allowing a user to approve or reject the execution of the single color calibration;

in the case of the user rejecting the execution of the single color calibration then the multi-color calibration is performed without the single color calibration; and in the case of the user accepting the execution of the single color calibration then the multi-color calibration is performed with the single color calibration.

* * * * *